June 18, 1935.  J. MORKOVSKI  2,005,555
LIFT MECHANISM FOR TRACTOR DRAWN IMPLEMENTS
Filed Dec. 23, 1933   3 Sheets-Sheet 3
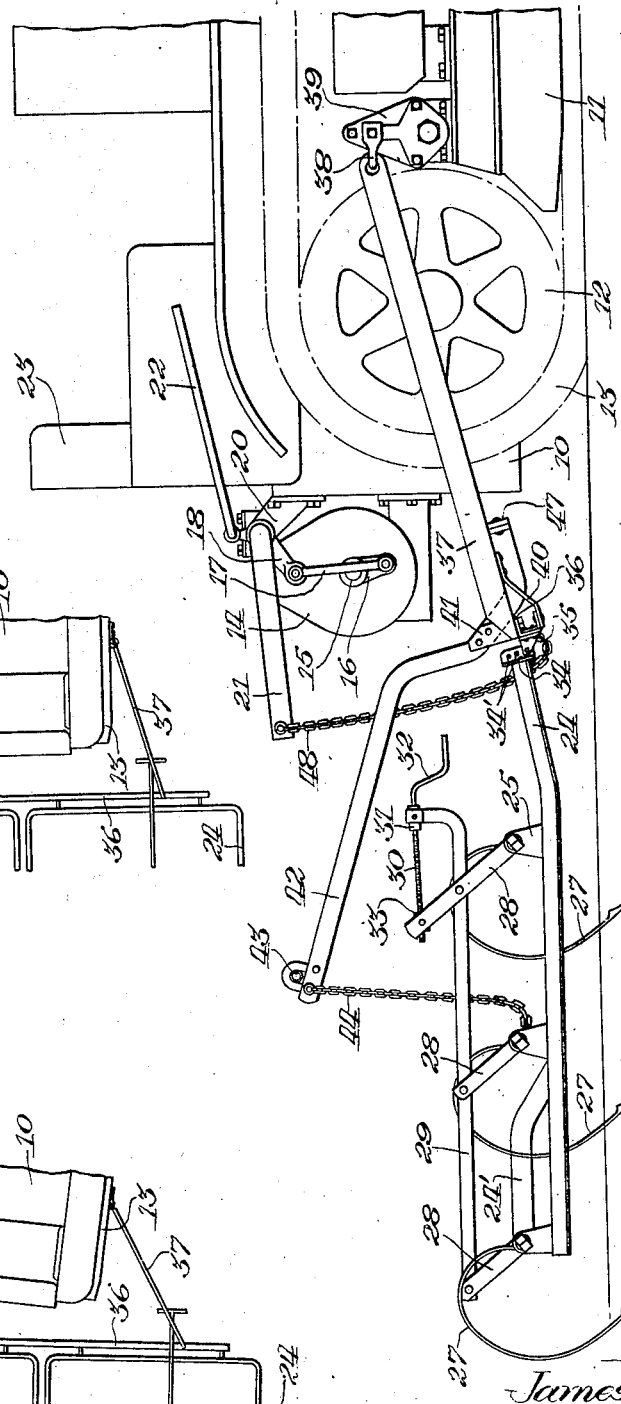
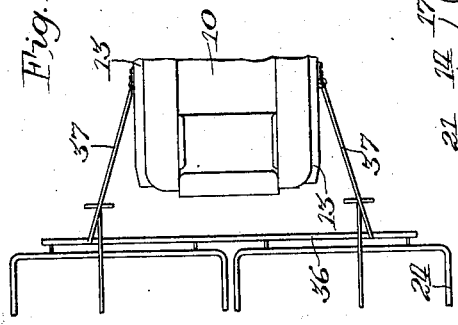
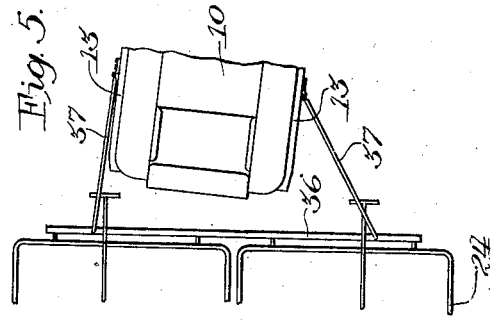

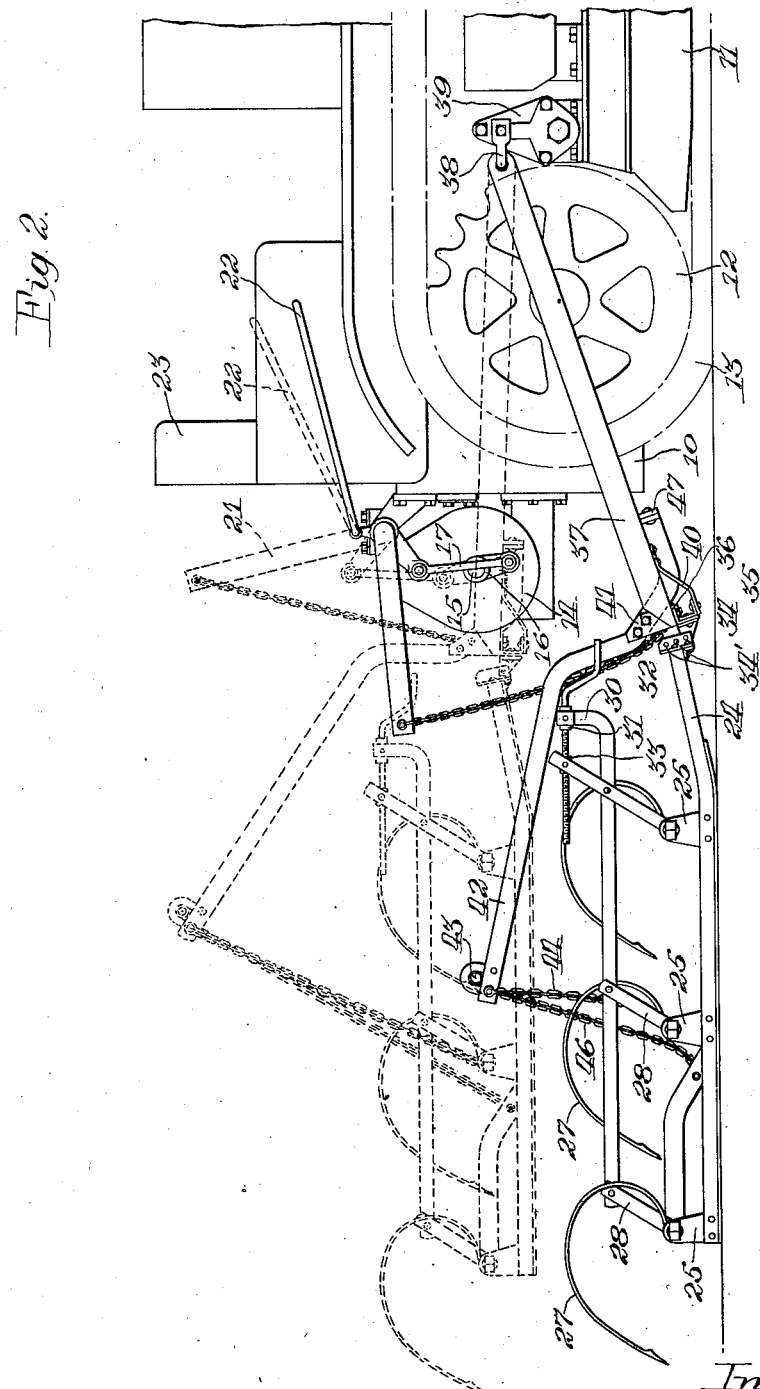

Patented June 18, 1935

2,005,555

UNITED STATES PATENT OFFICE 2,005,555

LIFT MECHANISM FOR TRACTOR DRAWN IMPLEMENTS

James Morkovski, Canton, Ill., assignor to International Harvester Company, a corporation of New Jersey Application December 23, 1933, Serial No. 703,781

16 Claims. (Cl. 97—47)

This invention relates to tractor implements. More particularly it relates to lifting means for an implement adapted to be connected to a tractor of the track laying type.

The principal object of the invention is to provide in a tractor attached implement having a freely folding frame structure lifting means operating from the tractor power take-off for lifting the implement out of soil engaging position. Other objects, such as providing for limited movement of the implement with respect to the tractor will be apparent from the detailed description to follow. These objects are accomplished by a construction such as shown in the drawings, in which:

Figure 2 is a side elevation of the same construction shown in Figure 1; (the implement is shown in lifted position in dotted lines);

Figure 3 is also a side elevation, showing the harrow teeth of the implement in soil engaging position; and, Figures 4 and 5 are top plan views on a small scale, illustrating the effect of angular movements of the tractor upon the flexible draft connections.

Figure 1:
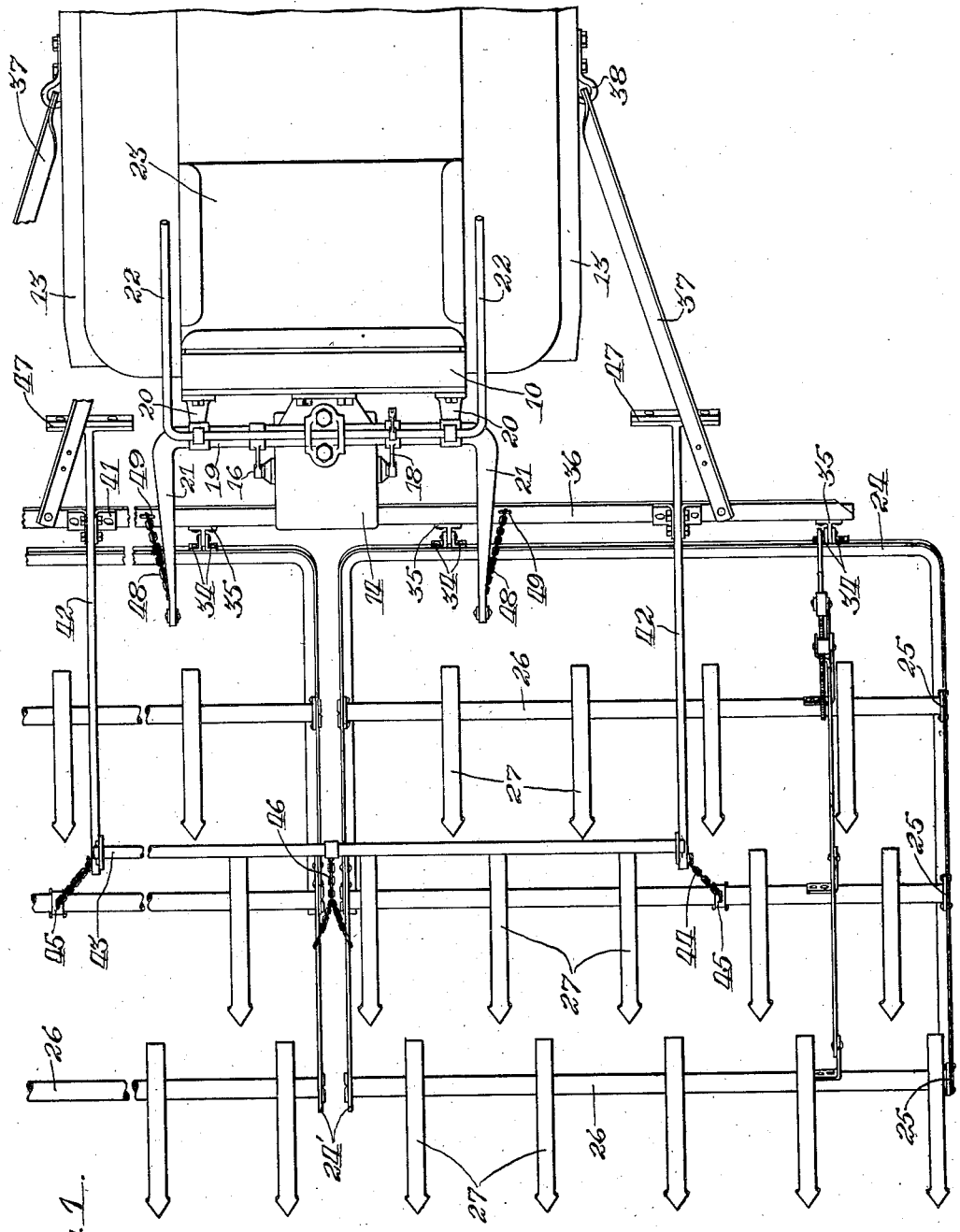
Figure 1 is a top plan view showing the rear portion of a track laying tractor and an implement embodying the invention attached thereto; (one end of the implement has been broken away in order to show the construction on a larger scale)

In the drawings a conventional tractor of the crawler type is illustrated having a main frame, 10, track frames 11 pivoted at their rear ends on the main frame 10, track chain driving sprockets 12, and track chains 13 diagrammatically illustrated. At the rear of the main frame, a power lift casing 14 is secured in position to be driven by the conventional power take-off shaft of the tractor. Said casing contains half revolution power lift mechanism, as shown in the United States Patent No. 1,911,373, May 30, 1933, including a transverse shaft 15 extending from each side of the casing. Aligned lifting cranks 16 rigidly secured to said shaft are connected by links 17 with arms 18 rigidly secured to a transverse rockshaft 19. Said rockshaft is rotatably mounted in bearing brackets 20 rigidly secured to the main frame 10. The rockshaft 19 is provided with rearwardly extending lifting arms 21 to be utilized as will be hereinafter described. Actuating levers 22 for controlling the operation of the power lift mechanism are provided at each side of the operator's seat 23 on the tractor.

The implement illustrated in the particular embodiment of the invention shown in the drawings is a spring tooth harrow, the elements of which are of a conventional construction. Two sections have been shown, although one section might be utilized, or a larger number than two. Each section of the spring tooth harrow includes a U-shaped frame 24. Said frame includes a transverse front portion and longitudinally extending side portions. At longitudinally spaced locations, upstanding brackets 25 are rigidly secured to the side portions of the frames 24. Transverse shafts or pipes 26 are mounted for rotation on transverse axes in transversely aligned pairs of the brackets 25. Spring harrow teeth 27 are secured in transversely spaced locations to the pipes 26. The teeth on the respective pipes are also staggered with respect to those on the adjacent pipes.

To provide means for altering the positions of the harrow teeth, which are of a conventional curved shape, parallel lever arms 28 rigidly secured to the pipes 26 are secured to a longitudinal adjusting bar 29. The forward arm 28 extends beyond the bar 29 to form a fulcrum thereon. The forward end of the bar 29 has an upward extension 30 carrying pivotally mounted thereon a block 31. A threaded adjusting rod 32, rotatably mounted in the block 31, is threaded through a block 33 pivotally mounted on the upper end of the forward arm 28, thereby providing means for altering the position of the harrow teeth with respect to the frame 24 and at the same time changing the angle of the teeth points with respect to the ground. This is a conventional means for adjusting the teeth on a spring tooth harrow.

Each frame 24 is pivotally connected on a transverse axis by means of two pairs of spaced brackets 34 to spaced brackets 35 secured to a transverse support 36 formed from an angle bar. The brackets 34 are provided with a plurality of vertically spaced openings 34' to provide means for vertically adjusting the point at which draft is applied through the pivotal connection of the support 36 with the frames 24.

Draft bars 37 are pivotally connected by hooks 38 to the main frame of the tractor forwardly of the track chain sprockets 12. The hooks 38 are secured to members 39 which are mounted over the pivot of the track frames 11 on the main frame 10. Said draft bars are loosely connected to the hooks 38 to provide for pivoting of the bars on a transverse horizontal axis and to provide for a certain amount of lateral movement; that is, pivoting about vertical axes.

Each of the bars 37 extends rearwardly and outwardly at a substantial angle with respect to the tractor and is pivotally connected on a substantially vertical axis to the transverse support 36. A reinforcing strap 40 is connected to the lower end of each bar 37 to provide a straddle mounting on the transverse support to hold it against any movement except about the vertical connecting pivot.

On the transverse support 36 inside each draft bar 37 and closely adjacent thereto, spaced upstanding brackets 41 are provided, to which a longitudinally extending lifting member 42 is rigidly secured. The lifting members 42 extend substantially vertically adjacent the brackets 41 for a substantial distance and from that point are bent rearwardly into a somewhat horizontal position. The rear ends of said members are connected by a pipe 43. Flexible lifting chains 44 connect the ends of the members with collars 45 secured to the center pipe 26, which carries the cultivator teeth. The collars 45 are positioned outwardly from the center of gravity of the harrow sections. To provide for lifting the unbalanced portions of the harrow sections, a flexible lifting connection in the form of a chain 46 is connected to the cross-pipe 43 and to the adjacent side portions of the frames 24. It will be noted that the construction of the side frames at the adjacent sides is somewhat different from that at the outer sides. An upwardly curved and rearwardly extending bar 24' carries the center ends of the rear teeth carrying pipes 26. This construction provides for better operation of the harrow during flexing movements in which the adjacent portions of the harrow sections drop downwardly below the outside portions.

Forwardly of the brackets 41 on the transverse support 36 the lifting members 42 extend downwardly and forwardly beneath the draft bars 37. Transverse members 47 are secured to the forward ends of said members in a position to slidably engage the lower edge of the draft bars 37. Said members form a T-head on the lifting members of a sufficient lateral width to engage the draft bars throughout the range of lateral movement provided for by the pivotal connections at both ends of the draft bars 37 and to thereby form a laterally flexible connection.

Flexible connections 48 in the form of chains are connected to the lifting arms 21 of the power lift construction and to eye bolts 49 mounted on the transverse support 36 in vertical alignment with the lifting arms.

In the operation of an implement attachment for tractors as illustrated, the lifting arms 21 on the rockshaft 19 are constructed of such a length that a sufficient vertical lift will be obtained at their ends by operation of the half revolution clutch lifting mechanism enclosed in the casing 14. As shown in Figure 2 in dotted lines, the lifting crank 16 of the power lift mechanism moves a vertical distance substantially twice its length, whereby the lifting arms 21 are raised to the position shown in dotted lines. By a subsequent actuation of the power lift by means of either of the actuating levers 22, the lifting arms are returned to the full line position. When vertical lift is applied through the chains 48, the transverse support 36 is lifted substantially vertically to a position depending upon the slack in the chains and the length of lift provided for in the lifting mechanism. With the harrow teeth either in ground engaging position, as shown in Figure 3, or with the teeth out of engaging position, as shown in Figure 2, the lifting operation is exactly the same. Vertical movement applied to the transverse support 36 lifts the rear ends of the draft bars 37 with a pivotal movement about their connection with the hooks 38. For this reason the transverse support and the draft bars 37 may be properly termed a draft frame. This frame is constructed by reason of the pivotal connections on vertical axes of the draft bars with the transverse support for a movement of translation of the support 36, whereby a certain amount of shifting may take place between the tractor and the implement. As the links 37 are not parallel, the movement is not one of pure translation, a certain amount of angling taking place as illustrated by a comparison of Figures 4 and 5.

The lifting members 42, which carry the entire weight of the harrow sections through the lifting connections 44 and 46, are extended forwardly to provide bracing means without exerting torque on the connection between the transverse support 36 and the draft bars 38. It is obvious that, if lateral flexibility of the draft frame is to be provided for, a rigid connection could not be made between the lifting levers and the draft bars. For this reason the transverse, horizontal T-heads formed by the members 47 have been provided. These T-heads slide transversely under the draft bars 37 during shifting of the transverse support with respect to the tractor. At the same time, for a lifting operation, the weight of the harrow sections is supported by the lifting levers without exerting torque on the transverse support, due to engagement of the T-head portions with the underneath edges of the draft bars 37.

Although the power lift mechanism is of the half revolution type, whereby the distance of lift is fixed, adjustments may be provided in the flexible connections to obtain the necessary lift and to provide for slack sufficient for normal fluctuations in ground level.

Although applicant has shown and described only a preferred embodiment of his improved tractor attaching means and tractor operated lifting means for an implement, it is to be understood that he claims as his invention all modifications falling within the scope of the appended claims.

What is claimed is:

1. A tractor implement comprising, in combination with a tractor, a draft frame connected to the tractor and extending longitudinally therefrom, said frame being flexible for lateral movement, an implement frame hinged to the draft frame on a transverse axis, a lifting member connected to one of said frames adjacent the hinge axis, means for connecting said lifting member to each of the frames at points spaced from the hinge axis, and means for applying vertical lift adjacent the hinge axis of the frames.

2. A tractor implement comprising, in combination with a tractor, a draft frame connected to the tractor and extending longitudinally therefrom, said frame being flexible for lateral movement, an implement frame hinged to said draft frame on a transverse axis, a lifting member connected to one of said frames adjacent the hinge axis, means for flexibly connecting said lifting member to each of the frames at points spaced from the hinge axis, and means for applying vertical lift adjacent the hinge axis of the frames.

3. A tractor implement comprising, in combination with a tractor, a draft frame having a transverse portion connected to the tractor and extending longitudinally therefrom, said frame being flexible for lateral movement of its transverse portion, an implement frame hinged to said draft frame on a transverse axis, a lifting member connected to one of said frames adjacent the hinge axis, means for connecting said lifting member to each of the frames at points spaced from the hinge axis, the connection with the draft frame being formed to maintain its engagement with the draft member during lateral movement of the transverse portion, and means for applying vertical lift adjacent the hinge axis of the frames.

4. A tractor implement comprising, in combination with a tractor, an implement frame including a draft member positioned rearwardly of the tractor, draft links pivotally connected to said frame on vertical axes, said links being also connected to the tractor on transverse horizontal and vertical axes, whereby the implement frame may move laterally and vertically with respect to the tractor, a lifting member secured to the implement frame adjacent the transverse line of connection of the draft links, lifting connections between said member and the implement frame at a point spaced rearwardly from its connection with the draft links, and means for connecting the lifting member to one of the draft links at a point spaced forwardly from the connection of the draft links with the implement frame, said means consisting of a transverse member secured to the lifting member and positioned beneath the draft link and engageable therewith for transmitting the lifting torque thereto throughout a substantial range of angular movement of the draft link.

5. A tractor implement comprising, in combination with a tractor, power lift mechanism mounted thereon, an implement frame including a draft member positioned rearwardly of the tractor, draft links pivotally connected to the tractor on transverse horizontal and vertical axes, whereby the implement frame may move laterally and vertically with respect to the tractor, a lifting member secured to the implement frame adjacent the transverse line of connection with the draft links, flexible lifting connections between said member and the implement frame at a point spaced rearwardly from its connection with the draft links, and means for connecting the lifting member to one of the draft links at a point spaced forwardly from the connection of the draft links with the implement frame, said means consisting of a transverse head positioned beneath the draft link and engageable therewith throughout a substantial range of angular movement of the draft link.

6. A tractor implement comprising, in combination with a tractor, power lift mechanism mounted thereon, an implement frame including a draft member positioned rearwardly of the tractor, draft links pivotally connected to said frame on vertical axes, said links being also connected to the tractor on transverse horizontal and vertical axes, whereby the implement frame may move laterally and vertically with respect to the tractor, lifting members secured to the implement frame adjacent the transverse line of connection with the draft links, lifting connections between said members to the implement frame at points spaced rearwardly from its connection with the draft links, and means for connecting the lifting members to the draft links at points spaced forwardly from the connections of the draft links with the implement frame for transmitting lifting torque thereto.

7. A tractor implement comprising, in combination with a tractor, power lift mechanism mounted thereon, an implement frame including a draft member positioned rearwardly of the tractor, draft links pivotally connected to said frame on vertical axes, said links being connected to the tractor on transverse horizontal and vertical axes, whereby the implement frame may move laterally with respect to the tractor, lifting members secured to the implement frame adjacent the transverse line of connection with the draft links, lifting connections between said members and the implement frame at points spaced rearwardly from its connections with the draft links, and means for connecting the lifting members to the draft links at points spaced forwardly from the connections of the draft links with the implement frame, said means consisting of transverse heads on the lifting members positioned beneath the draft links and engageable therewith throughout a substantial range of angular movement of the draft link.

8. A tractor implement comprising, in combination with a tractor, an implement frame structure positioned rearwardly of the tractor, a transverse support pivotally connected to said frame structure, draft links pivotally connected to said transverse support and to the tractor, a lifting lever rigidly secured to the transverse support and extending rearwardly over the frame structure, a lifting connection between said lifting lever and the frame structure, a forward extension formed on the lifting lever, said extension having a portion extending transversely beneath one of the draft links and engaging said link forwardly of its connection with the frame structure, a power lift mounted on the tractor, a lifting arm operatively connected to the power lift, and a lifting connection between said arm and the transverse support.

9. A tractor implement comprising, in combination with a tractor, an implement frame structure positioned rearwardly of the tractor, a transverse support pivotally connected to said frame structure, draft links pivotally connected to said transverse support and to the tractor, a lifting lever rigidly secured to the transverse support and extending rearwardly over the frame structure, a lifting connection between said lifting lever and the frame structure, a forward extension formed on the lifting lever, said extension having a horizontal portion extending transversely beneath one of the draft links, a power lift mounted on the tractor, a lifting arm operatively connected to the power lift, and a lifting connection between said arm and the transverse support.

10. A tractor implement comprising, in combination with a tractor, an implement frame structure positioned rearwardly of the tractor, a transverse support pivotally connected to said frame structure, draft links pivotally connected to said transverse support and to the tractor, a pair of transversely spaced lifting levers rigidly secured to the transverse support and extending rearwardly over the frame structure, lifting connections between said lifting levers and the frame structure, forward extensions formed on the lifting levers, said extensions having horizontal portions extending transversely beneath the draft links, a power lift mounted on the tractor, a lifting arm operatively connected to the power lift, and a lifting connection between said arm and the transverse support.

11. A tractor implement comprising, in combination with a track laying tractor, an implement frame structure positioned rearwardly of the tractor, a transverse support pivotally connected on a transverse axis to said frame structure, draft links pivotally connected to said transverse support and extending forwardly and inwardly along the side of the tractor, said draft links being pivotally connected to the tractor for lateral and vertical movement, a lifting arm rigidly secured to the transverse support and extending rearwardly over the frame structure, a lifting connection between said lifting lever and the frame structure, a forward extension formed on the lifting lever, said extension having a portion formed to engage one of the draft links for transmitting lifting torque thereto, a power lift mounted on the tractor, a lifting arm adapted to be operated by the power lift, and a lifting connection between said arm and the transverse support.

12. A tractor implement comprising, in combination with a track laying tractor, an implement frame structure positioned rearwardly of the tractor, a transverse support pivotally connected on a transverse axis to said frame structure, draft links pivotally connected to said transverse support and extending forwardly and inwardly along the side of the tractor, said draft links being pivotally connected to the tractor for lateral and vertical movement, a lifting arm rigidly secured to the transverse support and extending rearwardly over the frame structure, a lifting connection between said lifting lever and the frame structure, a forward extension formed on the lifting lever, said extension having a horizontal portion extending transversely beneath one of the draft links, a power lift mounted on the tractor, a lifting arm adapted to be operated by the power lift, and a lifting connection between said arm and the transverse support.

13. A tractor implement comprising, in combination with a track laying tractor, an implement frame structure positioned rearwardly of the tractor, a transverse support pivotally connected on a transverse axis to said frame structure, draft links pivotally connected to said transverse support and extending forwardly and inwardly along the sides of the tractor, said draft links being pivotally connected to the tractor for lateral and vertical movement, spaced lifting levers rigidly secured to the transverse support and extending rearwardly over the frame structure, lifting connection between said lifting levers and the frame structure, forward extensions formed on the lifting arm, said extension having a horizontal portion extending transversely beneath the respective draft links, a power lift mounted on the tractor, a lifting arm adapted to be operated by the power lift, and a lifting connection between said arm and the transverse support.

14. A tractor attached implement comprising, in combination with a tractor, draft members pivotally connected to the sides of the tractor forwardly of the rear end thereof and extending rearwardly beyond the tractor and at an angle outwardly therefrom, a transverse draft bar pivotally connected to the draft members for limited movement in an endwise direction, an implement frame connected to the transverse bar, lifting members connected to the implement frame and extending forwardly along the draft members, connections formed to engage the lifting members with the draft members upon the application of lift, and means for applying lifting means adjacent the point of connection between the frame and the transverse bar.

15. A tractor attached implement comprising, in combination with a tractor, draft members pivotally connected at the sides of the tractor forwardly of the rear end thereof and extending rearwardly and outwardly therefrom, the rear ends of said bars being spaced from the tractor for a limited swinging movement, a transverse draft bar pivotally connected to the rear ends of the draft members whereby said bar may move in transverse directions to either side of the tractor a distance determined by the swinging movement of the draft members, an implement connected to the draft bar, and means connected to the draft bar and the implement and engageable with the draft members in any lateral position of the draft bar with respect to the tractor, said lifting means being operable to lift the implement upwardly about the forward connecting ends of the draft members as a pivot axis.

16. A tractor attached implement comprising, in combination with a tractor, draft members pivotally connected at the sides of the tractor forwardly of the rear end thereof and extending rearwardly and outwardly at an angle therefrom, a transverse draft bar pivotally connected to the rear ends of the draft members whereby said bar may move in transverse directions to either side of the tractor a distance determined by the angular divergence of the draft members, an implement connected to the draft bar, and means connected to the draft bar and the implement and engageable with the draft members in any lateral position of the draft bar with respect to the tractor, said lifting means being operable to lift the implement upwardly about the forward connecting ends of the draft members as a pivot axis.

JAMES MORKOVSKI.